A. F. BISCEGLIA.
DEVICE FOR WASHING FRUIT.
APPLICATION FILED MAY 26, 1917.

1,257,574.

Patented Feb. 26, 1918.

WITNESSES
M. J. Sclaya
C. E. Lodge

INVENTOR
ALPHONSE F. BISCEGLIA
BY F. B. Bates
ATTORNEY

UNITED STATES PATENT OFFICE.

ALPHONSE F. BISCEGLIA, OF SAN JOSE, CALIFORNIA.

DEVICE FOR WASHING FRUIT.

1,257,574.  Specification of Letters Patent.  Patented Feb. 26, 1918.

Application filed May 26, 1917. Serial No. 171,225.

*To all whom it may concern:*

Be it known that I, ALPHONSE F. BISCEGLIA, a citizen of the United States, residing at San Jose, in the county of Santa Clara and State of California, have invented certain new and useful Improvements in Devices for Washing Fruit, of which the following is a specification.

The present invention relates to a device for washing fruit, and is designed for use in connection with fruit canning factories generally for washing the fruit prior to canning the same; although its use is not restricted for the washing of fruit for canning, such as apples, oranges, lemons, peaches, and other fruit that is packed in crates or boxes for shipment to market may be washed, leaving the fruit clean and sanitary.

The objects of my invention are first to produce an effective, durable, device for the desired purpose of washing fruit or vegetables, before passing the same for canning or packing for market.

Another object of my invention is to provide a device simple of construction, of few parts, and of easy access for cleaning, economical of operation both as to the power required and in the prevention of wasting of the water or liquid being used.

Another object of my invention is to produce a fruit washing device which will be extremely quick in operation and easy of adjustment and one in which the conveying devices will work automatically with the feed and discharge, and to improve generally the construction and operation of the several parts entering into the formation of the machine as a whole.

My invention will be best understood from the consideration of the following detailed description, taken in connection with the accompanying drawings forming a part of this specification, and though the drawings show a practical embodiment of the invention, the latter may be otherwise embodied without sacrifice of any of the salient features of the invention.

To comprehend the invention, reference should be had to the accompanying sheet of drawings, wherein—

Similar characters of reference indicate similar parts throughout the views.

Figure 1:
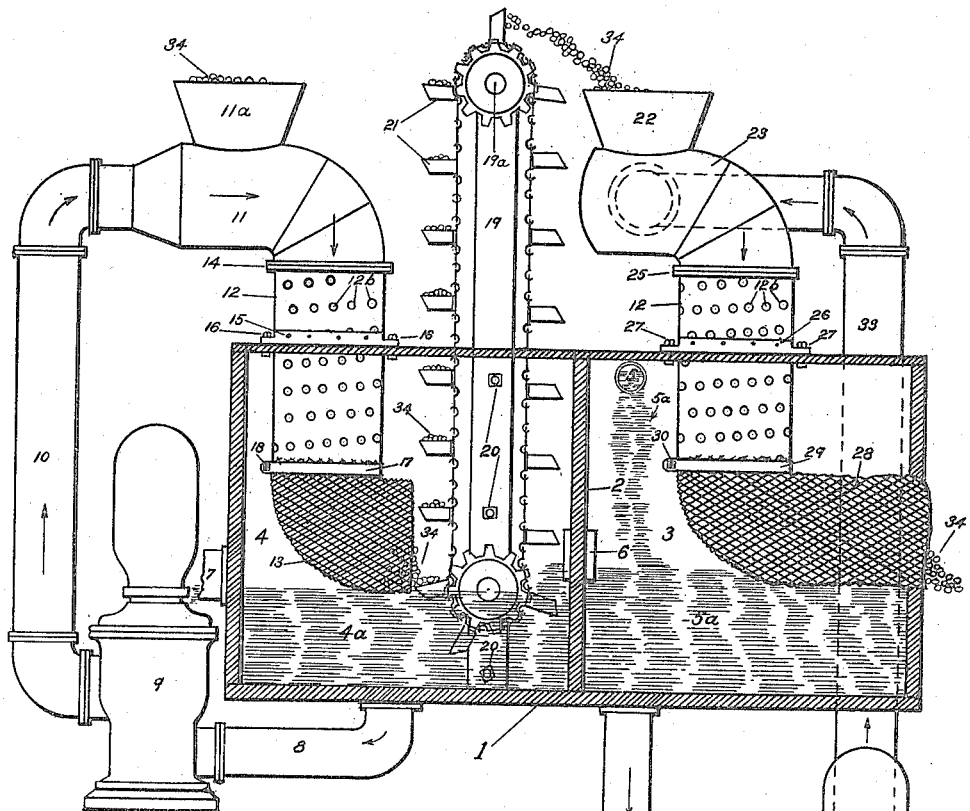
Figure 1 is a front view of my device showing tank in section with the front side removed, showing spiral fruit washing device attached thereto.
Figure 2:
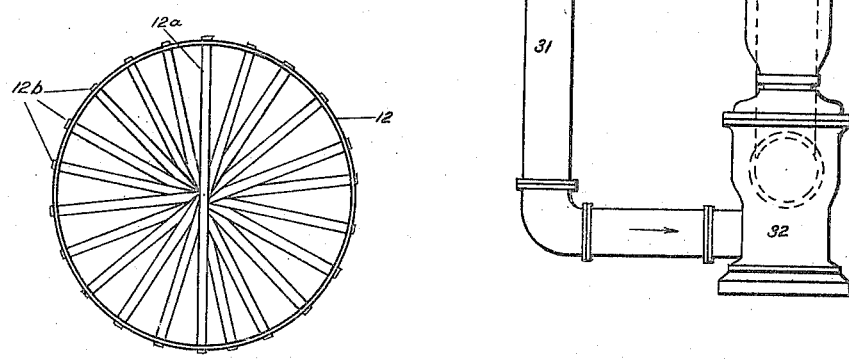
Fig. 2 is a plan view of the spiral fruit washer showing small tubing in spiral position.

Referring to the drawings, 1 indicates the water or liquid tank to which my device is fastened; the same may be made of metal or any other material of the required size as to the work required.

A partition 2 is shown in tank 1 near the center thereof dividing said tank 1 into two compartments as 3 and 4.

Water intake pipe 5 is shown opening into compartment 3 through which water $5^a$ is supplied to compartment 3.

Water is shown in compartment 3, at $5^a$; overflow pipe 6 is shown through partition 2, outlet overflow pipe 7 is shown leading from compartment 4. Water is shown at $4^a$ in tank 4; pipe 8 is shown connected to the bottom of tank 4, and pump 9; pipe 10 is shown connected to pump 9 and to fruit receiver 11. Spiral fruit washer is shown at 12, made of boiler iron of the required size, having small tubes $12^a$ set therein in spiral form. Tubular metal screen 13 is shown connected to spiral fruit washer 12. Fruit hopper $11^a$ is shown connected to fruit receiver 11. Fruit 34 is shown entering fruit hopper $11^a$, receiver 11 being connected to spiral fruit washer 12, by flanges 14. Spiral fruit washer 12 is fastened to tank 1 by band flange 15, and bolts 16. Band flange 15 is adjustable up or down on spiral fruit washer 12, and is adapted to hold spiral fruit washer 12 to tank 1 in a secure manner. Tubular metal screen 13 is fastened to the lower end of spiral fruit washer 12, by steel band 17 and bolt 18. Fruit conveyer is shown at 19, fastened to the inside of tank 1 by bolts 20; the fruit conveyer 19 is driven by shaft $19^a$ from a power not shown; conveyer buckets are shown at 21 to convey the fruit to the second washing, the hopper 22 is shown connected to receiver 23; said receiver 23 is connected to spiral fruit washer 12 by flanges 25. The spiral fruit washer 12 is held in place on tank 1 by band flange 26 and bolts 27.

At the lower end of the spiral fruit washer 12 is fastened tubular metal screen 28. The tubular metal screen 28 is fastened to spiral fruit washer 12 by steel band 29 and bolt 30.

Water 5ª is shown in compartment 3, water pipe 31 leading to pump 32 is connected thereto; delivery water pipe 33 is connected to pump 32 and to the receiver 23. The fruit 34 is shown entering hopper 22. Spiral fruit washers 12 are made of boiler iron of the required diameter and length, having a plurality of small tubing 12ª placed therethrough in spiral position, the small tubing 12ª being expanded on the outside of the spiral fruit washers 12 as shown at 12ᵇ for the purpose of holding the small tubing 12ª in place and to prevent any leakage around the tubing 12ª.

The operation of my device is as follows:

Water is admitted through intake pipe 5, filling compartments 3 and 4 up to their overflow pipes 6 and 7, thus supplying water 5ª to compartment 3, the water 5ª overflowing through pipe 6 to compartment 4, thus supplying compartment 4 with water 4ª for the first washing of the fruit. The overflow pipe 7 is for the purpose of carrying off the unclean water 4ª from the first washing of the fruit. Water 4ª is taken through pipe 8 as the arrow points to pump 9, and thence through pump 9 where the water is forced up through pipe 10, as the arrows point, and through fruit receiver 11, as the arrows point, to spiral fruit washer 12, and thence through spiral fruit washer 12 and through tubular screen 13 back to compartment 4. Fruit 34 is admitted in hopper 11ª and passes into receiver 11, and by the rush of water through the receiver 11, is carried into spiral fruit washer 12, over small spiral tubing 12ª to tubular screen 13, and out through the open end of screen 13 to conveyer 19, where the fruit is taken up by buckets 21, and delivered to hopper 22 prior to the second washing.

Clean water 5ª is taken from compartment 3 through pipe 31 to pump 32, the water 5ª is then forced up through pipe 33 to receiver 23, carrying the fruit down through receiver 23 and through spiral fruit washer 12 over the small spiral tubing 12ª to tubular screen 28; thus the fruit 34 is washed the second time and is delivered clean and sanitary out of screen 28 ready for packing and shipping. The water 5ª is returned to compartment 3 through tubular screen 28, where the water 5ª passes through overflow pipe 6 into compartment 4, and the unclean water 4ª in compartment 4 passing out through overflow pipe 7. The water is replenished by water intake 5. This operation is continuous.

Having thus described my invention, what I claim as new and desire to secure by Letters Patent, is:

1. In a device for washing fruit the combination of a tank having two compartments, a water intake pipe, opening into one of said compartments, adapted to supply water to both compartments, an overflow pipe, adapted to deliver water from one compartment to the other compartment, an overflow pipe, adapted to carry off the unclean water from one of said compartments, a pump connected with each compartment, adapted to take water from each compartment, hoppers, adapted to deliver fruit to be washed, fruit receivers, adapted to receive the fruit to be washed from the hoppers, water pipes connected to the fruit receivers, pumps, connected to the water pipes, adapted to force water through the receivers; spiral fruit washers, adapted to wash the fruit passing therethrough; metal tubular screens fastened to the lower end of the spiral fruit washers, adapted to deliver the fruit washed therefrom, as and for the purpose described.

2. In a device for washing fruit the combination of a tank having two compartments, a spiral fruit washer in each compartment, adapted to wash the fruit through a first and second washing, a fruit conveyer, adapted to convey the fruit to the second washing, means by which the water from the second washing of the fruit is utilized for the first washing of the fruit, substantially as shown and described.

3. In a device for washing fruit the combination of a tank having two compartments, a spiral fruit washer in each compartment, water in each compartment, overflow pipe in each compartment, pumps connected to each compartment, a tubular metal screen connected with each spiral fruit washer, fruit receiver connected to each spiral fruit washer, fruit hopper connected to each fruit receiver; a fruit conveyer, means for operating the fruit conveyer, conveyer buckets, attached to the fruit conveyer, adapted to convey the fruit to a second washing; substantially as shown and described.

4. In a device for washing fruit the combination of a tank having a partition through the center of the tank, adapted to divide the tank into two compartments, a water intake pipe in one of the compartments, adapted to supply water to both compartments, an overflow pipe leading from each compartment, a pump connected to each compartment, a spiral fruit washer, connected to each compartment, a fruit receiver connected with each spiral fruit washer, fruit hoppers connected with each fruit receiver, a tubular metal screen fastened to the lower end of each spiral fruit washer, a fruit conveyer, adapted to convey the fruit to a second washing, conveyer buckets, attached to the fruit conveyer, as and for the purpose described.

5. In a fruit washer, the combination with a spiral fruit washer, a tank with two compartments located thereunder and communicating therewith, means for forcing water from the tank into the spiral fruit washer, the elevator mechanism for conveying the fruit from the first washing to the second washing, means by which the water from the second washing of the fruit is utilized for the first washing of the fruit, as and for the purpose described.

In testimony whereof I have signed my name to this specification in the presence of two subscribing witnesses.

ALPHONSE F. BISCEGLIA.

Witnesses:
M. J. SELAYA,
C. E. LEWIS.